United States Patent [19]

Dove

[11] Patent Number: 4,638,569

[45] Date of Patent: Jan. 27, 1987

[54] BUSINESS FORM DESIGN AID

[75] Inventor: Thomas D. Dove, Cincinnati, Ohio

[73] Assignee: Bedinghaus Business Forms, Inc., Cincinnati, Ohio

[21] Appl. No.: 725,493

[22] Filed: Apr. 22, 1985

[51] Int. Cl.$^4$ .......... G01B 3/14

[52] U.S. Cl. .......... 33/562; 33/DIG. 9; 33/464

[58] Field of Search .......... 33/DIG. 9, 564, 566, 33/562, 565, 464, 452, 456

[56] References Cited

U.S. PATENT DOCUMENTS

| | | | |
|---|---|---|---|
| 1,510,503 | 10/1924 | Schmidt | 33/DIG. 9 X |
| 2,179,658 | 11/1939 | Gallagher | 33/452 X |
| 2,720,706 | 10/1955 | Laine | 33/566 X |
| 3,224,100 | 12/1965 | Rose . | |
| 3,875,670 | 4/1975 | Hudgins | 33/562 X |
| 3,985,168 | 10/1976 | Lundquist . | |
| 4,268,967 | 5/1981 | Brana | 33/452 X |

*Primary Examiner*—Harry N. Haroian
*Attorney, Agent, or Firm*—Wood, Herron & Evans

[57] ABSTRACT

A multi-element aid for the design of business forms of different sizes having selectable characteristics. As disclosed, the business form design aid includes four elongated elements slidably interconnected to form an enclosed, generally rectangular area of variable size. Each element includes a border guide marking, which is aligned with the inner edge of one adjacent element, as well as one or more business form indicia spaced apart from the border guide marking along the element. The inner edge of each element also meets a border guide marking on a second adjacent element. In this way, for any interior opening size, selectable business form design indicia are spaced apart from each of the inner edges of the four elements by consistent distances.

6 Claims, 1 Drawing Figure

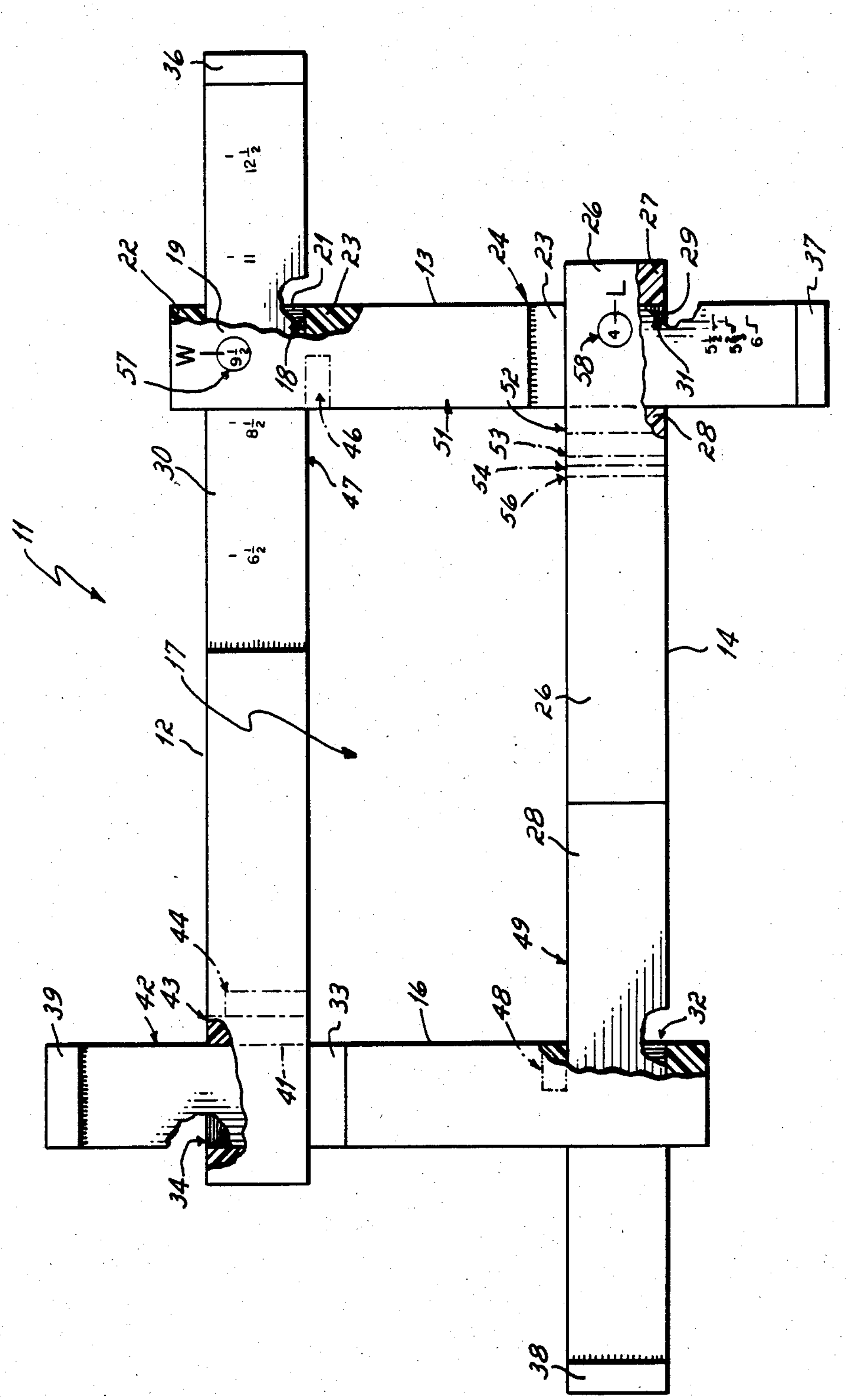

BUSINESS FORM DESIGN AID

DESCRIPTION OF THE INVENTION

This invention relates generally to aids in the design of business forms, and more particularly concerns a multi-element business form design aid in the nature of a template for defining an enclosed area of variable size.

Many business forms of various types are available in standard formats. A user of such a standard form is, however, required to conform his or her business practices to the style and content of the standard form. Alternatively, a business person may incur the expense of having a custom form designed for a particular business need.

Between these two extremes, certain business forms are available which, while having certain standard characteristics, may be largely varied to fit the user's particular circumstances. One example of such a business form is a "peel-apart mailer", which is made up of a number of sheets glued together about their perimeters and individually perforated. Characteristics of such pell-apart mailers may vary, such as the size of the mailer and the number of perforated sheets contained therein.

In the past, in order for a business person to specify the characteristics of a peel-apart mailer for use in his or her business, the person often utilized a booklet of forms having different formats, usually set up on gridded sheets. The locations of glue margins and perforation lines for each form size were shown on different sheets selected from the booklet. The person designing the form would then add particular printed matter to the gridded sheets within the available borders for the sheets of the selected peel-apart mailer form.

Providing business persons with booklets of form design sheets encompassing the various types and sizes of peel-apart mailers, when only one or two types of mailer may be of interest, has been somewhat costly. In addition, a business person may be unable to specify a particular type of peel-apart mailer if the appropriate design sheets have already been used and are not present in the booklet. Consequently, it would be advantageous to a producer of business forms, such as peel-apart mailers, to be able to provide customers with the ability to specify such forms without the use of pre-formatted sheets.

It is consequently an object of the present invention to provide a means for specifying a business form, having certain selectable standard characteristics, without the need for pre-formatted, or pre-sized, specification sheets.

This is accomplished in accordance with certain principles of the present invention by the provision of a business form design aid comprising four elements movably positionable relative to one another, with each element having an inner edge meeting the inner edges of two adjacent elements to define an enclosed area of variable size. The multi-element design aid is employed with gridded sheets for developing the form design.

In a particular type of business form design aid to be disclosed herein, the elements of the design aid are slidably interconnected in the form of a template defining a variable rectangular area, establishing the perimeter of the form to be designed. In the disclosed design aid, each movable element includes near its inner edge a border guide marking which is aligned with the inner edge of one adjacent element. Each element also includes one or more business form indicia spaced apart from the border guide marking. The inner edge of each element is aligned with a border guide marking on a second adjacent element. In this way, the perimeter of a form, which may vary in size, is defined in a manner to permit marking business form indicia locations on gridded sheets relative to each of the four perimeter edges.

In accordance with a further aspect of the invention, one of the design air elements further includes a first scale of indicia of lengths of the forms to be designed while an adjacent element includes a window for identifying one indicium on said scale which indicates the selected length. A second scale and cooperating opening is provided so that the width of the form to be designed is similarly indicated.

Further objects and advantages of the invention, and the manner of their implementation, will become apparent upon reading the following detailed description in conjunction with the single drawing FIGURE, which shows a plan view of a design aid in accordance with the present invention, wherein certain portions are shown broken away.

While the invention is susceptible to various modifications and alternative forms, a specific embodiment thereof has been shown by way of example in the drawing and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

DETAILED DESCRIPTION

Turning now to the drawing, a multi-element design aid 11 for assisting in the design of business forms includes four elongated elements 12, 13, 14 and 16, slidably interconnected to form an enclosed, generally rectangular area 17 of variable size. The illustrated design aid 11 includes indicia useful for the design of a one-way peel-apart mailer, but other forms of the design aid 11 may be employed for assisting in the design of other types of business forms. For example, a design aid bearing a modified form of indicia may be provided for assisting in the design of a two-way peel-apart mailer. Alternatively, the requisite information for a two-way peel-apart mailer may be provided on the opposite sides of the elements of the illustrated design aid 11.

The element 12 of the design aid 11 slides within a channel 18 through an end portion of the element 13. The channel 18 is defined by upper and lower layers 19, 21 of the element 13. Sandwiched between the layers 19 and 21 are spacers 22, 23, the edges of which define the side walls of the channel 18. The upper and lower laminates 19, 21 end at the location 24 along the element 13; and, in the illustrated design aid, the end portion of the element 13 (which is received within a channel through the element 14) is of a reduced thickness, being made up of the spacer 23. The element 14 includes, at its end receiving the element 13, an upper laminate 26, an end spacer 27, a spacer 28, and a lower laminate 29, to define a channel 31 similar to the channel 18 through the element 13.

The element 14 includes the reduced thickness (spacer) portion 28 which passes through a channel 32 in the element 16. The element 16 includes a reduced thickness (spacer) portion 33 received within a channel 34 in the element 12, which is also formed in the same fashion as the channels 18, 31 and 32. The element 12 includes a reduced thickness spacer portion 30, which is received in the channel 18.

Each element 12, 13, 14 and 16 includes an increased thickness end stop 36, 37, 38 and 39, respectively, to prevent the withdrawal of an element from the channel of the adjacent element through which it passes. The end stops may be formed from, for example, upper and lower laminates on the spacers 30, 23, 28 and 33.

Since each element slides through one adjacent element and along a second adjacent element, the locations along each element relative to the second adjacent element remain at a fixed distance. For example, with regard to the element 12, a reference line, or border guide marking, 41 aligned with the edge 42 of the element 16 provides a consistent reference point for distances measured from the edge 42, regardless of the size of the opening 17. In the particular design aid 11 illustrated, a line hole perforation margin 43 and a glue margin 44 are indicated, spaced apart from the reference line 41 on the element 12 and the edge 42 of the element 16. As the element 12 slides relative to the element 16 to vary the opening 17 to permit designing different sizes of forms, the spacing of the margins 43 and 44 from the edge 42 remain constant. Similarly, a glue margin 46 is provided on the element 13 spaced apart from the inner edge 47 of the element 12; and a glue margin 48 is provided along the element 16 spaced apart from the inner edge 49 of the element 14. Spaced apart from the inner edge 51 of the element 13 are a line hole perforation margin 52, a glue margin 53, and perforation locators 54 and 56. In the illustrated design aid, the glue margin indication 53 also serves as a locator for a perforation line.

In using the design aid 11, the elements 12, 13, 14 and 16 are moved relative to one another to establish the interior opening 17 at the correct size for the form to be designed. In doing this, each of the various indicia, in the form of margin lines and perforation lines, remains at the same location relative to the inner edge of an adjacent element. In order to facilitate selecting the proper size for the opening 17, the upper laminate 19 of the element 13 and the upper laminate 26 of the element 14 are each apertured as shown at 57 and 58, and form size markings which may be viewed through these apertures. The dimensions are marked along the elements 12 and 13 for viewing thorugh the apertures 57 and 58, respectively. In the position illustrated, for example, the border of the opening 17 is set for a form having a width of 9½ inches and a length of 4 inches.

To use the design aid 11 in designing, for example, a three-sheet peel-apart mailer, the elements 12, 13, 14 and 16 are first moved to establish the proper size for the opening 17 corresponding to the size of the form to be designed. The elements are moved relative to one another until the proper length and width indicia are visible in the apertures 58 and 57 for the size of form to be designed. Utilizing three sheets (or sections) of gridded paper, three form borders, following the inner edges which define the opening 17 of the design aid 11, are drawn on paper. The line hole perforation margins are drawn onto each such gridded bordered area. In addition, the second and third sheets are marked with the glue margins 46, 48; and the second sheet is marked with the perforation line 53, while the third sheet is marked with the perforation line 54. Each of the gridded bordered areas, as marked, serves as the design area for one of the three sheets of the three-sheet peel-apart mailer.

Once the margins are drawn for each of the design areas, the appropriate printed matter and artwork, if any, is located within the appropriate borders for each of the sheets. Typically, the top sheet has the most usable area. The second sheet has less area, and the third sheet slightly more area than the second sheet, for printed material and the like. For a three-sheet mailer, for example, the top sheet is often utilized internally by a business and is releasably secured (such as by a light adhesive or crimping) to the second sheet and may be readily removed. The second sheet in this case serves as the face of an envelope to be mailed, and the third sheet contains the information to be conveyed to the recipient of the mailer. The second and third sheets are glued together at the glue margins indicated on the elements of the design aid (and transferred to the gridded design areas when the form is designed). The perforation line 53 serves as the right-hand border for the third sheet, and the perforation line 54 serves as the right-hand border for the second sheet. For mailers having a greater number of sheets, four or more gridded design areas are drawn and marked, and additional perforation lines such as 56 are utilized.

As can be seen, by using the design aid 11, a wide variety of sizes of business forms may be designed with the appropriate margins and perforation lines, or any other indicia, readily available for marking on a design sheet. Any size of gridded paper or the like may be used, and there is no requirement to maintain particular sizes of gridded worksheets for different sizes of forms. While the illustrated design aid has dealt with the indicia and parameters required to design a peel-apart mailer, it is clear that a great number of business forms can be designed using a design aid such as that illustrated by placing the appropriate indicia along the elements of the design aid for the particular type of form to be designed.

What is claimed is:

1. A business form design aid comprising four elongated elements, each element having two space-apart, opposite ends;

first and second outer, parallel segments; and a middle segment disposed parallel to and between said first and second segments, said first, second and middle segments extending between said opposite ends;

said first and second segments each being discontinuous over a substantial portion of its length between a first point proximate one of said opposite ends of said element and a second point intermediate said opposite ends to expose a portion of said middle segment, said exposed portion being of a predetermined width;

said middle segment being interrupted proximate another of said opposite ends of said element through a longitudinal distance at least equal to said predetermined width to define a channel for slidably receiving an exposed portion of the middle segment of another said element;

said first, second and middle segments of all said elements being located in first, second and middle planes, respectively, with said middle planes disposed between said first and second planes;

the exposed portion of the middle segment of each said element being slidably received in the channel of an adjacent element disposed perpendicular thereto to permit relative perpendicular sliding motion of the adjacent element along the exposed portion of the middle segment of the other element between said first and second points such that each element is movable in a first direction relative to one adjacent element and movable in a second, substantially perpendicular, direction relative to a second adjacent element, each element having an inner edge meeting the inner edges of the two adjacent elements substantially at right angles so that the inner edges of the four elements define an enclosed, generally rectangular area of variable size but with a minimum size defined between the inner edge and the midstream location of at least two adjacent elements, each element further including a business form design indicium spaced apart from the inner edge of one adjacent element, each element moving relative to said one adjacent element such that the business form indicium remains spaced apart from the inner edge of said one adjacent element by a constant amount.

2. The design of claim 1 in which each element includes a border guide marking met by the inner edge of a first adjacent element and spaced apart from other said business form design indicium.

3. A method of designing a business form with the business form design aid of claim 1 comprising the steps of:

positioning the design aid on a layout sheet;

moving the elements of the design aid relative to one another to select a particular size of the enclosed area;

marking business form design information on the layout sheet at particular locations based upon the location of business form design indicia on the elements of the design aid; and adding further business form design information on the layout sheet.

4. The design aid of claim 1 in which a first of the four elements further includes a first scale of indicia of sizes of a form to be designed and in which an element adjacent said first element includes means for identifying an indicium in said first scale of indicia related to the size of the enclosed area defined by the four elements.

5. The design aid of claim 4 in which a second of the elements further includes a second scale of indicia of sizes of a form to be designed and in which an element adjacent said second element includes means for identifying an indicium in said second scale of indicia related to the size of the area defined by the form elements, said first and second elements having inner edges extending in substantially perpendicular directions.

6. The design aid of claim 5 in which each said means for identifying an indicium comprises a window opening in each said adjacent element exposing the indicium to be identified.

* * * * *